Patented June 6, 1939

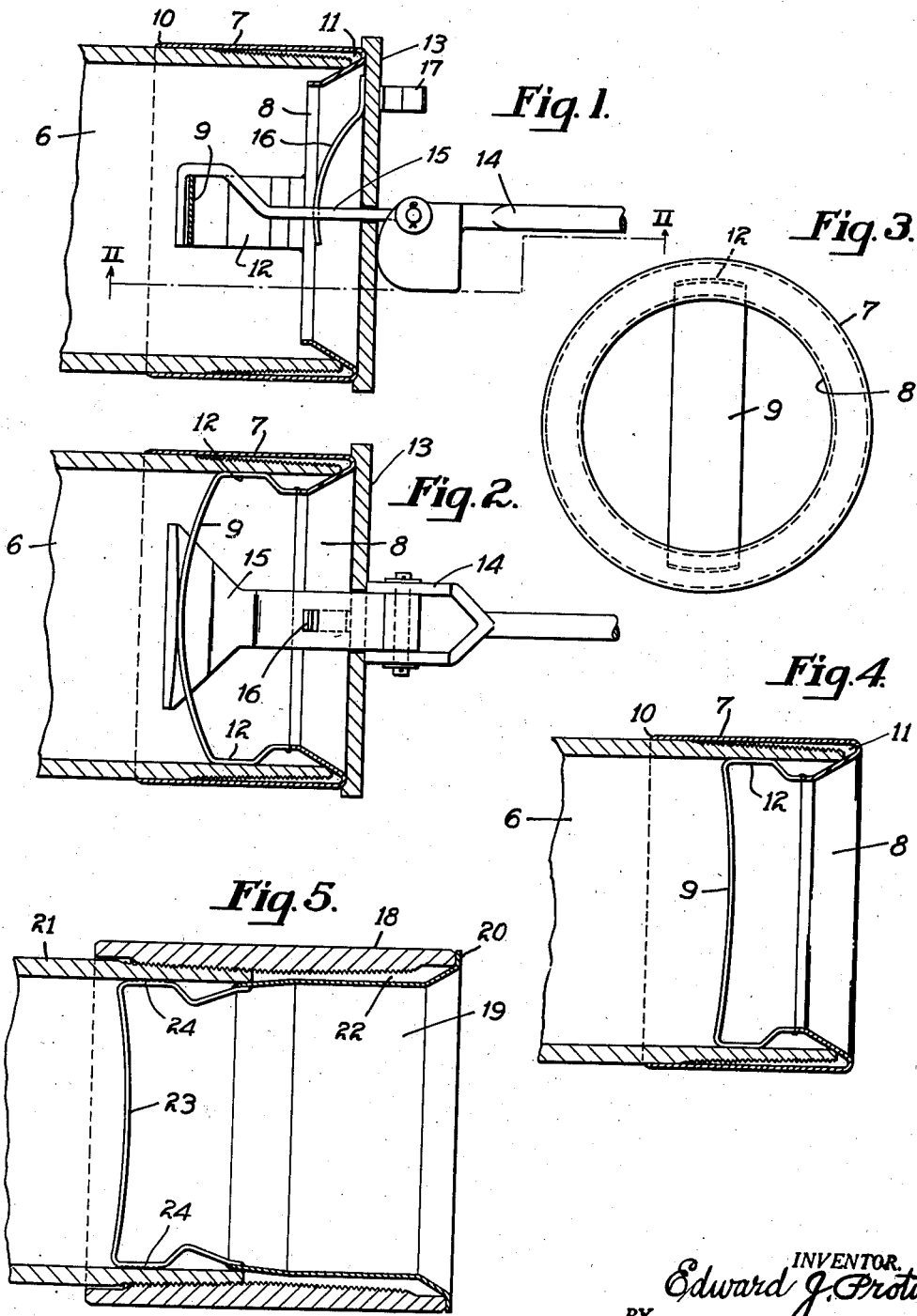

2,161,197

UNITED STATES PATENT OFFICE 2,161,197

THREAD PROTECTOR

Edward J. Protin, Charleroi, Pa.

Application March 10, 1938, Serial No. 195,070

2 Claims. (Cl. 138—96)

My invention relates to thread protectors for pipe or the like, for protecting threads against damage during handling and storage of the pipe previous to its installation at a place of use.

One object of my invention is to provide a protector of improved form which can readily be applied to and removed from the pipe without turning it on the pipe threads, and wherein no separately-formed retaining keys are required.

Another object of my invention is to provide a protector which will effectively form a seal that prevents access of water or dirt to the pipe threads.

Some of the forms which my invention may take are shown in the accompanying drawing wherein Figure 1 is a longitudinal sectional view through a portion of a pipe with my protector applied thereto; Fig. 2 is a view taken on the line II—II of Fig. 1; Fig. 3 is an end view of the protector; Fig. 4 is a sectional view showing the protector parts in approximately their final position on a pipe, and Fig. 5 is a view showing another form of protector.

Referring first to Figs. 1 to 4, a portion of pipe is indicated by the numeral 6, the protector applied thereto comprising an annular metallic band or sleeve portion 7 and an annular skirt portion 8 which is bent backwardly and extends into the pipe. A bowed strap or strut member 9 has its ends welded or otherwise secured to the skirt 8 and may be made either of a malleable metal or of heavy sheet metal of a springy nature.

It is common practice to taper pipes somewhat at their threaded areas, the extremity of the pipe being of somewhat smaller outside diameter than the unthreaded portion at the inner end of the threaded area. The sleeve portion 7 may be formed of sheet metal and may be either of true cylindrical form or have its innermost edge of reduced diameter. In either case, such edge 10 will have close fitting engagement with the pipe, and the protector can be applied without damage to the pipe threads, because of said taper. Where additional protection is required to prevent access of water or dirt to the pipe threads, heavy grease will be applied to the protector or the pipe threads and in the space 11, and when the protector is applied, this grease will form an effective seal.

The protector is first slipped upon the pipe, whereupon a tool is applied to bend the bowed strut 9 toward a diametral line in order to cause it to grip the interior wall of the pipe. The final position of the strut may be approximately as indicated in Fig. 4, and in case it is of a spring-like nature, it will be drawn slightly past a diametral line extending through its ends, so as to yieldably exert a thrust upon the pipe and will not spring back to its original bowed position. This bending of the strut brings its axially-straight and transversely-curved portions 12 into close engagement with the pipe wall, thus giving an extended area of frictional engagement to effectively resist accidental withdrawal of the protector.

One form of tool for bending the strut 9 to its gripping position comprises a base plate 13, and a cam lever 14 to which a hooked pull bar 15 is pivotally connected. The bar 15 extends through a hole in the plate 13, and it will be seen that when the lever 14 is swung downwardly, the bar 15 and the strut 9 will be drawn outwardly, thus straightening the strut into gripping engagement with the pipe. A spring finger 16, carried by the plate 13, extends through a hole in the bar 15 and normally urges the bar rearwardly so as to yieldably maintain the bar in an inwardly-projected position where it can be more readily brought into hooked engagement with the strut. A spring clip 17 is provided on the plate 13 for holding the lever 14 in folded-back position when the tool is not in use.

In order to remove the protector, the strut 9 can be pushed or hammered back to its original position or it can be pulled further outwardly from the position shown in Fig. 4, so as to collapse or bend the same out of gripping engagement with the pipe.

In Fig. 5 I show a protector for an internally threaded coupling 18. In this structure an annular band 19 has a flange 20 formed at its outer end for engagement with the extremity of the coupling and will serve as a sealing element. The band 19 tapers inwardly somewhat so that it will have close-fitting engagement with the extremity of a pipe 21. The space 22 between the band and the threads will be filled with grease when desired. A strut 23 similar to the strut 9 is welded to the inner edge of the band 19 and will initially be bowed as is the strut 9 in Fig. 2, it being drawn to its gripping position as shown in Fig. 5, by a suitable tool. The periphery of the strut 23 has spurs or teeth 24 formed thereon, which will bite into the pipe and resist accidental withdrawal of the protector.

I claim as my invention:

1. A thread protector comprising a band for covering the threaded area of a pipe and having a skirt portion which will extend into the pipe, a strut element extending transversely of the axis of the pipe and bowed rearwardly, and a gripping element on each end of the strut element and extending forwardly, each with its forward end connected to the inner edge of the said skirt, those portions of the gripping elements adjacent to the strut extending axially of the pipe, in position to engage the internal wall thereof, and the forward portions thereof being deflected inwardly, the strut element being bendable toward and past straight-line position to effect expansive movement of the gripping elements.

2. A thread protector comprising a band for covering the threaded area of a pipe and having a skirt portion which will extend into the pipe, a strut element extending transversely of the axis of the pipe and bowed rearwardly, and a gripping element on each end of the strut element and extending forwardly, each with its forward end connected to the inner edge of the said skirt, those portions of the gripping elements adjacent to the strut being curved co-axially of the pipe and extending axially of the pipe, in position to engage the internal wall thereof, and the forward portions thereof being deflected inwardly, the strut element being bendable toward and past straight-line position to effect expansive movement of the gripping elements.

EDWARD J. PROTIN.